Oct. 6, 1959 H. P. BOSWAU ET AL 2,907,983
MECHANICAL COUNTING RELAY
Filed June 19, 1956 4 Sheets-Sheet 1
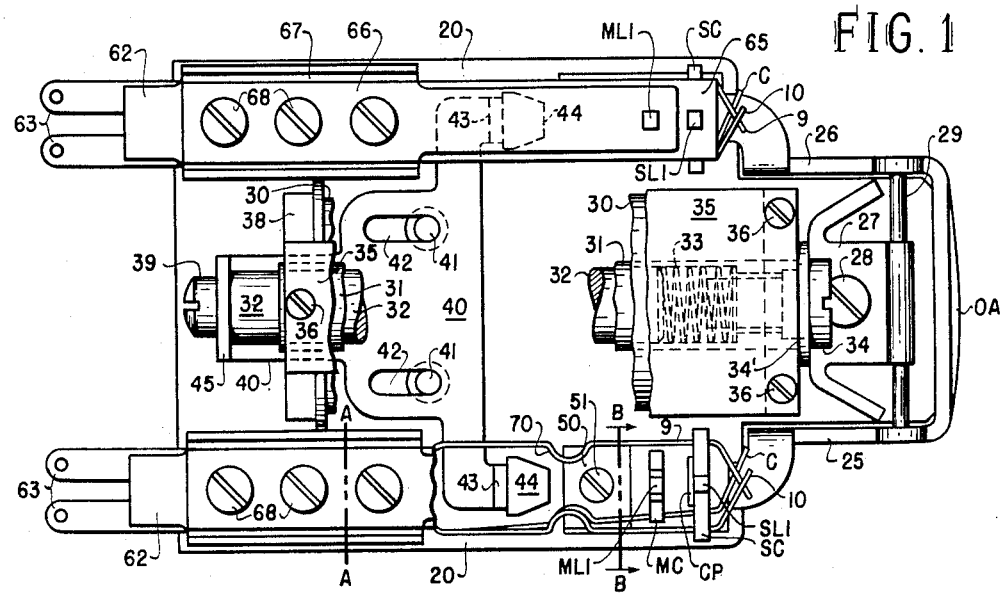
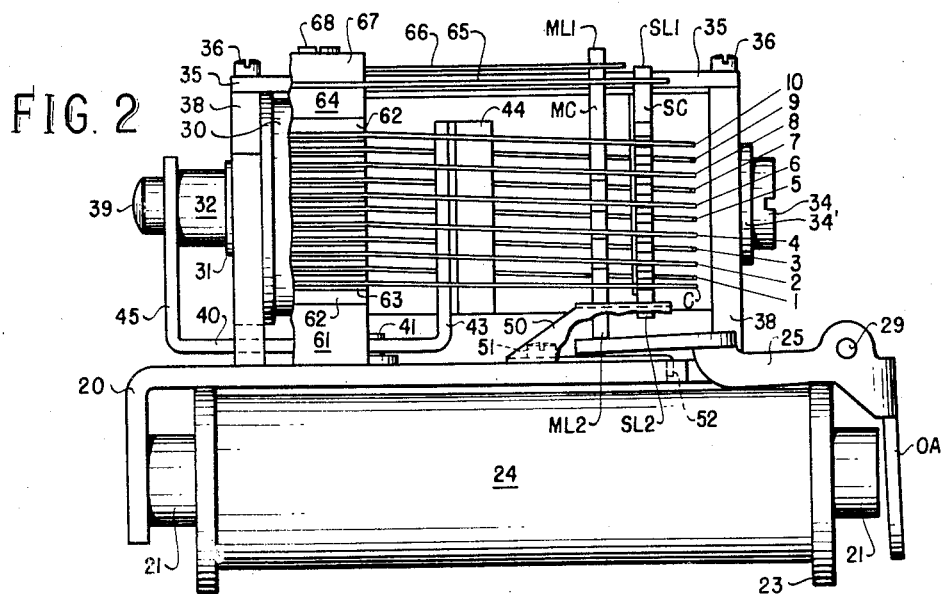
INVENTORS
HANS P. BOSWAU
HARVEY W. CLAUSEN
HARRY G. EVERS
BY
C. A. Gulbransen
ATTY.

Oct. 6, 1959

H. P. BOSWAU ET AL 2,907,983

MECHANICAL COUNTING RELAY

Filed June 19, 1956

*INVENTORS*
HANS P. BOSWAU
HARVEY W. CLAUSEN
HARRY G. EVERS
BY
C. A. Gulbrandsen
ATTY.

Oct. 6, 1959     H. P. BOSWAU ET AL     2,907,983
MECHANICAL COUNTING RELAY

Filed June 19, 1956     4 Sheets-Sheet 4

INVENTORS
HANS P. BOSWAU
HARVEY W. CLAUSEN
HARRY G. EVERS
BY
ATTY.

United States Patent Office 2,907,983
Patented Oct. 6, 1959

2,907,983

MECHANICAL COUNTING RELAY

Hans P. Boswau, Los Altos, Calif., and Harvey W. Clausen and Harry G. Evers, Genoa, Ill., assignors to Leich Electric Company, Genoa, Ill., a corporation of Illinois Application June 19, 1956, Serial No. 592,329

8 Claims. (Cl. 340—168)

This invention relates in general to electromagnetic counting devices of the type used for counting received electrical impulses and for closing successive electrical circuits in accordance with the number of impulses in a counted series.

An object of the present invention is to provide an improved counting device of the above type having simple and inexpensive parts which reliably performs its successive counting operations.

Another object of the present invention is to provide an improved counting device having an operating magnet, a release magnet, eleven circuit closing wires, a stationary insulating comb having eleven stepped notches, one for each wire, a movable insulating armature comb having ten lugs, and a common contacting plate secured to the stationary comb for successively engaging successive ones of said wires when the operating magnet is successively operated and restored. Each stepped notch in the stationary comb is individual to one of the wires. Each stepped notch includes a normal insulating step position in which the individual wire is tensioned to rest, a circuit closing step position in which the individual wire engages the common contacting plate to complete a circuit, and an open circuit insulating step position in which the above circuit is opened and in which the wire rests until the release magnet is operated.

When the operating magnet is operated and restored the movable comb is operated to cause a first one of the lugs thereon to engage and move a first wire which drops into its circuit closing step position to engage the common contacting plate where it remains during successive operations of the operating magnet to close successive circuits through the contacting plate. In addition, this first wire engages and displaces a second wire from its individual normal position to drop the second wire down on top of a second one of the insulating lugs of the operated movable comb. When the operating magnet and the movable comb restore, the second wire is forced off the second insulating lug of the movable comb and drops further down into the operating path of the second lug and on top of the circuit closing step position of its individual notch to complete a first circuit including said first wire, the common contacting plate and the second wire. The next movement of the movable comb causes said second lug on the movable comb to engage said second wire and move it to engage and displace a third wire from its individual normal position to drop the third wire down on top of the succeeding, or third, insulating lug of the movable comb, while said second wire is moved off its individual circuit closing step position, by said second lug, to drop down into its individual open circuit insulating step position of the stationary comb to open the first circuit. When the operating magnet and movable comb restore, the third wire is forced off the third insulating lug of the movable comb and drops further down into the operating path of said third lug and on top of its circuit closing step position of its individual notch to complete a second circuit including said first wire, said common contacting plate and said third wire. Successive operations and restorations of the movable armature comb operate successive ones of said wires in the same manner as described above to close successive circuits through the common contacting plate to said first wire.

When the release magnet is operated a common insulating bar engages a curved section on each of said wires to restore all wires back to their normal insulating step positions in said stationary comb.

Other objects and features of the invention will become apparent from the following description of the drawings:

Fig. 1 shows a top view of the improved counting device with certain of the parts cut away.

Fig. 2 shows a side view with part of the spring or wire pileup cut away.

Figure 11:
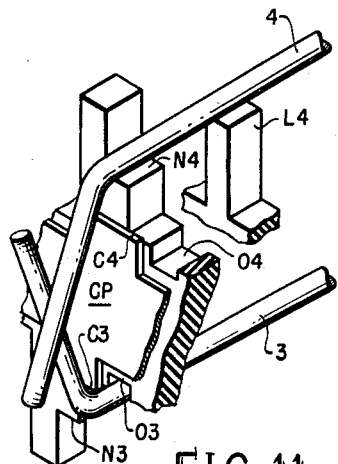

Fig. 11 is a perspective view showing the position of wires 3 and 4 after the third pulse with wire 3 engaging the contact plate to complete the third circuit while wire 4 is still in its normal position.

Figure 12:
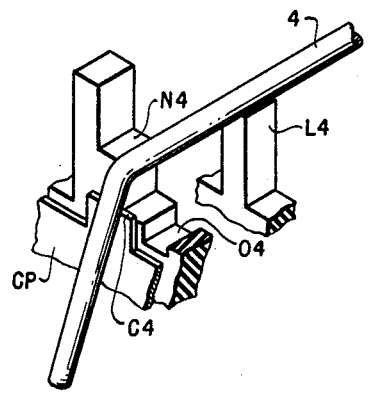

Fig. 12 shows the position of wire 4 resting on top of lug L4 of the movable armature comb when the magnet is energized on the fourth pulse.

Figure 13:
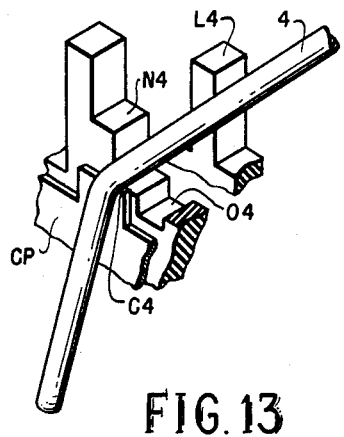

Fig. 13 shows the position of wire 4 engaging the contact plate when the magnet is restored after the fourth pulse to close the fourth circuit, and to show wire 4 now positioned in the operating path of lug L4.

Figure 14:
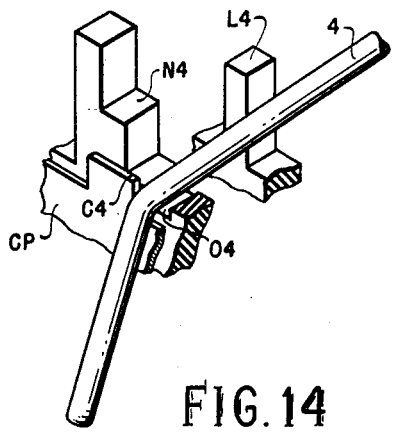

Fig. 14 shows the position of wire 4 in its circuit open position when the magnet is energized on the fifth pulse.

Figure 3:
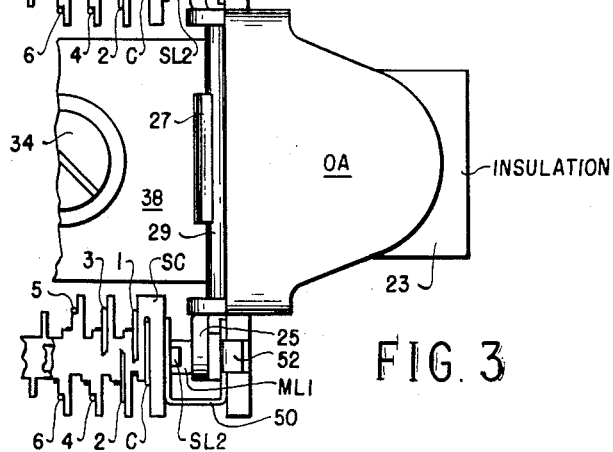
Fig. 3 shows an end view looking at the armature end.

The mechanism comprises a magnet 24 having an iron core 21 secured to the heelpiece 20. The heelpiece 20 is substantially L-shaped having an enlarged surface for mounting two spring wire pileups and a solenoid magnet 30 between the two wire pileups on one side, while the operating magnet 24 is mounted on the opposite surface. At the right hand side of the drawings, as shown in Figs. 1 and 2, the heelpiece 20 is step cut to provide a place for mounting the operating armature OA. The armature OA is rotatably mounted on the step cut portion in the usual manner by means of a yoke 27, screw 28 and pivot pin 29. The armature OA has two operating arms 25 and 26 extending under the movable comb MC and the free ends of the wires in the two wire pileups as shown in Figs. 1 to 3, inclusive.

The restoring, or solenoid magnet 30 comprises a coil, a sleeve 31, an armature 32, and a restoring arm 40 for restoring the circuit closing wires to their normal positions. The solenoid magnet 30 is mounted on the heelpiece 20 by means of metallic end plates 38 secured to the heelpiece 20 by means of screws (not shown). A metallic cover 35 is secured on top of the end plates 38 by means of screws 36. The coil of magnet 30 is wound around the sleeve 31 which is secured in place by means of screw 34 in the right hand end plate 38 as best seen in Fig. 1. The screw 34 extends part way in sleeve 31 as shown in Fig. 1 where it engages a coil restoring spring 33. The armature 32 is slidably mounted in the sleeve 31 and moves to the right when the magnet 30 is energized while the spring 33 restores the armature 32 to the position shown in Fig. 1 when the magnet 30 is deenergized. A U-shaped metallic arm 40 is secured to the armature 32 by means of the up turned leg 45 and screw 39. Arm 40 is provided with two up turned legs 43 on each of which is mounted by means of rivets (not shown) an insulating bar 44, preferably of "Bakelite," for engaging the semicircular curved portions of the wires to restore such wires to their normal positions when the solenoid magnet 30 is energized. The arm 40 has two guide slots 42 for guiding the arm 40 when the arm 40 is operated and restored by solenoid magnet 30. Extending lugs 41 of rivets, secured in heelpiece 20, extend up into the two guide slots 42 to guide the arm 40.

The two wire pileups each comprise eleven circuit closing wires, including the common wire C and wires 1 to 10, inclusive, insulated from each other by insulators 62. Each wire is placed between two insulators 62 and each wire engages a metallic plate 63 which is extended to the left, as seen in Fig. 1, to form circuit terminals for each wire. Metallic spacers 61 are placed below the bottom insulator 62 and a metallic spacer 64 is placed above the top insulator 62. A tensioned holding spring 65 is placed above the top spacer 64 and a U-shaped spacer 67 is placed on the holding spring 65. A tensioned restoring spring 66 is placed in the channel of the U-shaped spacer 67. Pileup screws 68 extend through holes in the spacers 67, 64 and 61, through the insulators 62 and through the metallic terminal plates and are screwed into threaded holes in the heelpiece 20 to hold each wire pileup. An insulating sleeve (not shown) encircles each screw 68 and insulates the screws from the plates 63 and the wires. Each of the wires have curved horizontal portions (not shown) located within the pileup to avoid the screw sleeves and to hold such wires to prevent them from turning on their longitudinal axis. Midway between the clamped pileup end and the free end of each wire is a semi-circular formed portion 70 which is engageable by the insulating bar 44, when the solenoid restoring magnet 30 is energized, to restore all of the wires to their normal positions. The free ends of each wire are bent, as shown in Fig. 1, so that each preceding wire will engage and preliminarily move the next adjacent wire on predetermined successive operations of the operating armature OA.

Figure 5:
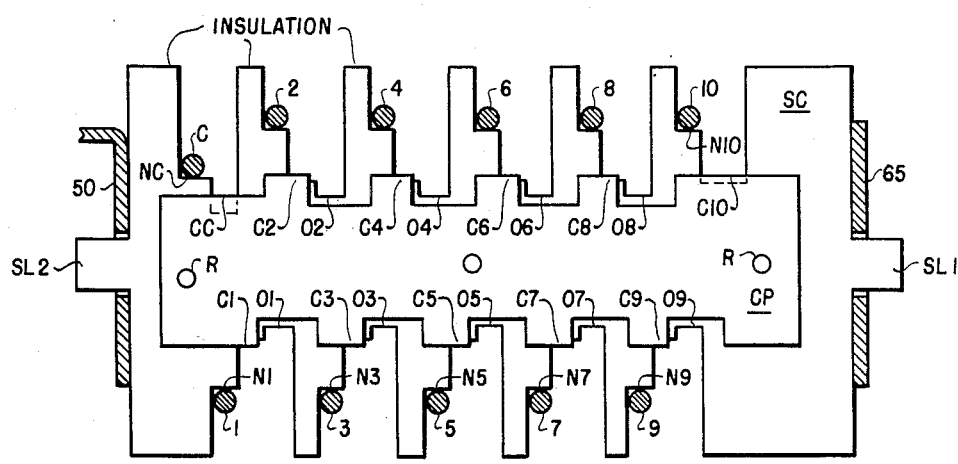
Fig. 5 is a view of the stationary comb to show the respective notches for the circuit closing wires and the contact plate.

A stationary comb SC, as best seen in Fig. 5, is preferably made of Bakelite and is provided for each wire pileup. Each stationary comb is provided with eleven stepped notches, one for each of the circuit closing wires C, 1 to 10 inclusive. A metallic contact plate CP is riveted by means of rivets R to the stationary comb SC. The contact plate is provided with circuit closing projections CC, C1 to C10, inclusive, which the respective wires engage when in their circuit closing positions. The stationary comb SC has a bottom lug SL2 which extends through a hole in the U-shaped platform 50 and has a top lug SL1 which extends through a hole in the holding spring 65. The spring 65 is tensioned to hold the stationary comb SC on top of the U-shaped platform 50. Each U-shaped platform 50 is mounted below the free ends of the wires and is secured to the heelpiece 20 by means of screws 51 and ears 52 which are positioned in recesses in the heelpiece 20. The lower lug SL2 extends through a hole in the platform 50 to hold the stationary comb in position. As previously mentioned, a step cut notch in the stationary comb is provided for each wire, and each notch is provided with a normal step position NC, N1 to N10, inclusive, a circuit closing position CC, C1 to C10 inclusive, in which position each wire engages the contact plate CP to complete its respective circuit, and an open circuit position O1 to O10 inclusive, in which the respective wires open their previously closed circuits. All wires are tensioned so as to normally rest in their normal positions as shown in Fig. 5, out of engagement with the contact plate, are operable to engage the contact plate CP in their circuit closing positions CC, C1 to C10 inclusive, and are further operable to rest in their open circuit positions O1 to O9, inclusive.

Figure 4:
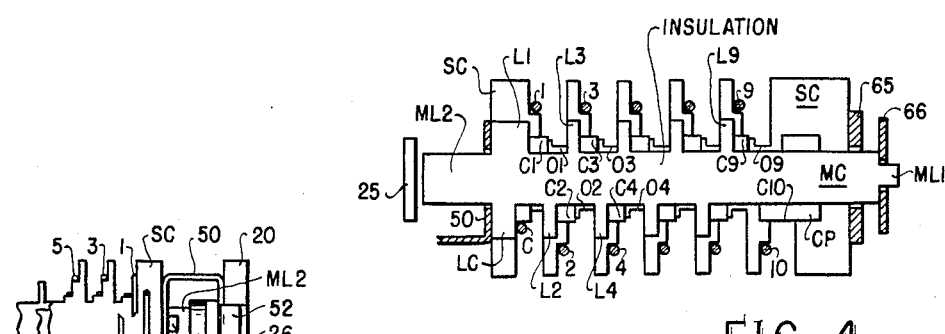
Fig. 4 is a sectional view taken on the line B—B of Fig. 1 to show the movable armature comb and its relation with the stationary comb.

A movable comb MC, as best seen in Figs. 1 and 4 is preferably made of Bakelite and is provided for each wire pileup. Each movable comb is provided with two end lugs ML1 and ML2. The right hand end of the movable comb MC, as shown in Fig. 4, extends freely through a hole in the holding spring 65 while the restoring spring 66 has a hole through which the top lug ML1 extends. The restoring spring 66 is tensioned against a ledge of the movable comb to normally hold the movable comb MC on top of platform 50. Each movable comb MC rests on top of its respective platform 50 and the bottom lug ML2 extends freely through a guide hole in the platform 50 to a position directly above the armature arms, such as armature arms 25 and 26.

Each movable comb MC is provided with ten movable lugs LC, L1 to L9, inclusive, which are moved to the right, as seen in Fig. 4, against the tension of restoring spring 66 whenever the operating magnet 24 is energized. All of the wires, except common wire C, are out of the operating path of their respective lugs L1 to L9, inclusive, when the counting device is fully restored in its normal position, while the common wire C is normally in the operating path of lug LC. The wires 1 to 10, inclusive, being in their normal positions, are shown in Fig. 4 located above and below the operating path of their respective lugs of the movable comb.

Figure 6:
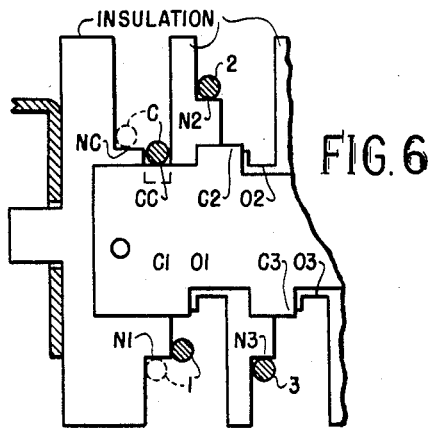
Fig. 6 shows the position of the circuit closing wires when the magnet is energized on the first pulse.

The operation of the counting device in response to the receipt of a series of impulses is as follows. The operating magnet 24 is operated by the first impulse to rotate armature OA and operate arms 25 and 26. The operation of arms 25 and 26 engage the lugs ML2 of their respective movable combs MC and move these movable combs upwardly as seen in Fig. 1, or to the right as seen in Fig. 4. Since only the common wires C are in the operating path of the lugs on the movable combs MC, the wires C are moved by lugs LC from their normal position NC to their circuit closing positions CC to engage the contact plate CP to prepare a first counting circuit. The bent portion of common wires C, in moving to their circuit closing positions CC, engage and move wires 1 from their normal positions N1, to the positions shown in Fig. 6 where the wires 1 now rest on top of lugs L1 of the movable combs in a manner similar to that shown for wire 4 in Fig. 12.

Figure 7:
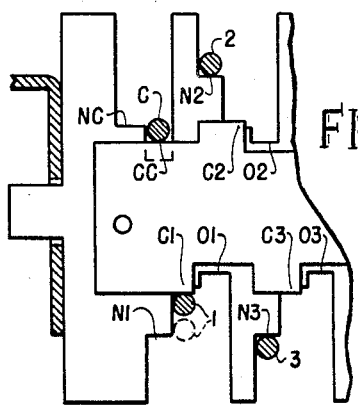
Fig. 7 shows the position of the wires when the magnet is restored after the first pulse.

When the magnet 24 deenergizes after the termination of the first pulse, the restorating springs 66 restore the movable combs MC into their normal restored position. In so doing the lugs L1 restore thereby allowing wires 1 to drop into their circuit closing positions C1 to engage contact plate CP to complete the first counting circuits. In addition, with wires 1 in their circuit closing positions the wires 1 are now placed in the operating path of lugs L1. The first counting circuits are now completed from wires 1 in their circuit closing positions in series with said contact plates CP and the common wires C as shown in Fig. 7.

Figure 8:
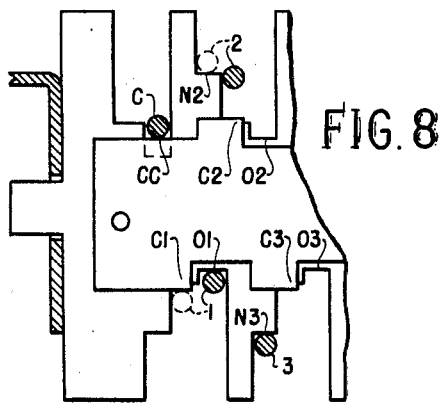
Fig. 8 shows the position of the wires when the magnet is energized on the second pulse.

When the magnet 24 is energized for the second pulse the armature OA moves the armature arms 25 and 26 to move both movable combs MC to cause lugs L1 to move wires 1 from their circuit closing positions C1 to their open circuit positions O1 to open the first counting circuits as shown in Fig. 8, since wires 1 are the only wires, at this time, which are located in the operating path of the lugs of the movable combs. The bent portion of wires 1 in moving from their circuit closing positions C1 to their open circuit positions O1 engage and move wires 2 from their normal positions N2 to the positions shown in Fig. 8 where the wire 2 now rests on top of lug L2 of the movable comb MC in its operated position.

Figure 9:
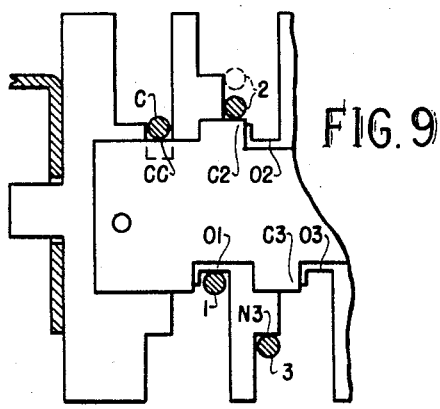
Fig. 9 shows the wire positions when the magnet is restored after the second pulse.

When magnet 24 is deenergized at the termination of the second impulse, the restoring springs 66 restore the movable combs MC and their lugs to cause wires 2 to engage contact plates CP and close the second counting circuits at circuit closing positions C2 as shown in Fig. 9. Wires 2 in their circuit closing positions C2 are now placed in the operating paths of lugs L2. The second counting circuits are now completed from wires 2 in their circuit closing positions C2 in series with their contact plates CP and the common wires C as shown in Fig. 9.

Figure 10:
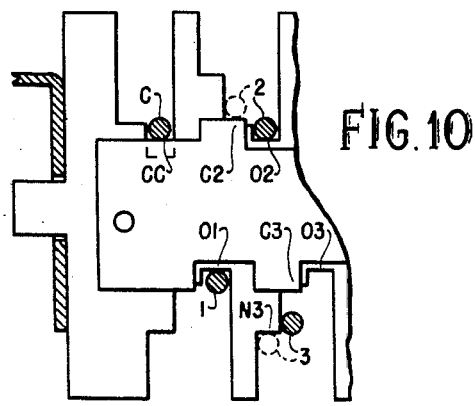
Fig. 10 shows the wire positions when the magnet is energized on the third pulse.

When the magnet 24 is energized for the third impulse, the armature moves both movable combs to cause lugs L2 on the movable combs to move wires 2 from their circuit closing positions C2 to their open circuit positions O2 to open the second counting circuits as shown in Fig. 10, since wires 2 are the only wires, at this time, in the operating path of the lugs of the movable combs. The bent end portions of wires 2 in moving from their circuit closing positions C2 to their open circuit positions O2 engage and move wires 3 from their normal positions N3 to the positions shown in Fig. 10 where the wire 3 now rests on top of lug L3 of the movable comb MC in its operated position.

When the magnet 24 is deenergized at the termination of the third impulse, the restoring springs 66 restore the movable combs MC and their lugs to cause wires 3 to engage contact plates CP and close the third counting circuits at circuit closing positions C3 as shown in Fig. 11. Wires 3 in their circuit closing positions C3 are now placed in the operating path of lugs L3. The third counting circuits are now completed from wires 3 in their circuit closing positions C3 in series with their contact plates CP and the common wires C.

When the magnet 24 is energized by the fourth pulse the lugs L3 engage and move wires 3 to their open circuit positions O3. The movement of wires 3 to their open circuit positions move wires 4 to the position shown in Fig. 12 which shows wire 4 resting on top of lug L4 a little below its normal position N4 and above its circuit closing position C4. When magnet 24 is deenergized at the termination of the fourth pulse, restoring spring 66 moves the movable comb and its lugs, including lugs 4, to the left, as seen in Fig. 13, from under wire 4. Wires 4 are tensioned and held against the vertical edge of their notches between their normal positions N4 and their circuit closing positions C4 until lugs 4 are moved from under wires 4 whereupon the tension of wires 4 cause these wires to drop down and engage contact plates CP at their circuit closing positions C4. Wires 4 in their circuit closing positions C4 are now placed in the operating paths of lugs 4 as shown in Fig. 13. The fourth counting circuits are now completed from wires 4 in their circuit closing positions C4 in series with their contact plates CP and their common wires C.

When magnet 24 is energized by the fifth pulse the lugs L4 engage and move wires 4 to their open circuit positions O4 as shown in Fig. 14. The movement of wires 4 to their open circuit positions also cause the bent free ends to engage and move wires 5 off of their normal positions to drop on top of their respective lugs 5 in a manner apparent from the foregoing description. Succeeding restorations and operations of magnet 24 cause successive ones of said wires to successively close and open the counting circuits in the same manner as previously described until ten pulses have been received. The counting device is arranged to count only ten impulses of a series, but with the addition of additional spaced lugs on the movable combs MC and additional wires and stepped notches in the stationary comb SC the number of impulses of a series could be increased.

In order to restore the circuit closing wires to their normal positions NC, N1 to N10 the release solenoid magnet 30 is energized to cause the armature 32 to move to the right as seen in Figs. 1 and 2. The movement of armature 32 to the right also moves arm 40 to the right to cause insulating bars 44 to engage the curved portions 70 of all springs and move them out from their open circuit positions, or their circuit closing positions and all but the common wire C out of the operating paths of the lugs on the movable combs MC. All wires are normally tensioned so that the wires are all restored to their normal positions, as shown in Fig. 5, when the solenoid magnet 30 restores arm 40 and insulating bars 44.

What we claim is:

1. In a counting device including a set of circuit closing wires, extending means on said wires, a stationary comb of insulating material having a stepped notch individual to each wire, each notch having three steps including a normal position, a circuit closing position, and an open circuit position, each said wire being normally tensioned to rest in its normal position; a movable comb of insulating material having an operating lug for each wire; each said wire, except the first of said wires, normally held out of the operating path of its respective lug when in its individual normal position; means for moving said movable comb to cause the first of said lugs to move and displace the first of said wires from its normal position to its circuit closing position, a common contacting plate engaged by said first wire in its circuit closing position to prepare a first circuit, the movement of said first wire from its normal position to its circuit closing position also causing the extending means on said first wire to engage a second wire and move the second wire from its normal position to drop on top of a second one of said lugs, said means restoring said movable comb and said lugs to cause said second wire to drop off of said second lug into its circuit closing position in engagement with said contacting plate to complete said first circuit, the dropping of said second wire into its circuit closing position also positioning said second wire in the operating path of said second lug, a second movement of said movable comb by said means causing said second lug to move said second wire from its circuit closing position to its open circuit position, the movement of said second wire from its circuit closing position to its open circuit position causing the extending means on said second wire to engage a third wire and move the third wire from its normal position to drop on top of a third lug, the restoration of said movable comb and said lugs by said means causing said third wire to drop off of said third lug into its circuit closing position in engagement with said contacting plate to complete a second circuit in series with said first wire, the dropping of said third wire into its circuit closing position also positioning said third wire in the operating path of said third lug, and successive operations and restorations of said means successively operating and restoring said movable comb and its lugs to successively move and displace successive wires of said set, first from their normal positions to their circuit closing positions and then to their open circuit positions to close successive circuits including said first wire, said contacting plate, and successive ones of said wires.

2. In a counting device as claimed in claim 1 including a release magnet, and means responsive to the operation of said release magnet for restoring all operated wires in their open circuit positions and in their circuit closing positions back to their normal positions.

3. An impulse counting relay comprising; an operating magnet; an armature controlled by said magnet, said magnet operable responsive to a received series of impulses to operate and restore said armature for each impulse; a set of circuit closing wires corresponding respectively to said impulses; convergent free ends on said wires, each wire having a circuit closing position and being movable in its turn to count the corresponding impulse; a common wire; means normally maintaining each wire except said common wire out of the operating path of said armature and for normally maintaining said common wire in said operating path; armature controlled means for moving said common wire into its circuit closing position, the convergent free end on said common wire engaging the convergent free end on a first of said wires to displace said first wire into its circuit closing position in series with said common wire and to place said first wire in the operating path of said armature controlled means responsive to the first operation and restoration of said armature to count the first impulse; said first wire and then successive ones of said wires being moved to displace a second and successive ones of said wires into successive circuit closing positions in series with said common wire and to place the second and successive wires in the operating path of said armature controlled means responsive to the second and subsequent operations and restorations of said armature to count the second and subsequent impulses, each convergent free end of a preceding wire in its circuit closing position being moved by the operation of said armature controlled means to engage the convergent free end of the next succeeding wire at their intersecting points to initially move said next successive wire, and the restoration of said armature controlled means enabling said next successive wire to move from its initially moved position into its circuit closing position to close a circuit in series with said common wire, and to be positioned into the operating path of said armature controlled means.

4. A counting relay comprising a magnet, an armature operable by said magnet, an insulating movable comb directly engageable and operable by said armature, a plurality of insulating lugs integrally formed on said comb, a plurality of circuit closing wires one each adjacent to a respective one of said lugs and operable by said adjacent lug, a stationary comb having a plurality of notches with shoulders for supporting said wires, each notch being individual to one of said wires, means for actuating and restoring said magnet to actuate and restore said armature and said movable comb, successive ones of said wires successively moved in their individual notches under control of successive ones of said lugs in response to successive actuations and restorations of said armature and movable comb to open and complete successive temporary electrical circuits, bent portions on each preceding wire effective after completing its respective preceding temporary electrical circuit and in response to a subsequent actuation of said movable comb for engaging and moving a subsequent wire in its notch to enable the next subsequent lug to control said subsequent wire so as to complete said subsequent temporary electrical circuit in response to the subsequent restoration of said comb, and said preceding wire being moved in its notch by its respective lug during said subsequent actuation of said comb to open said preceding temporary electrical circuit.

5. The counting relay as claimed in claim 4, and further including a common metallic plate mounted on said stationary comb, said circuit closing wires, when in their circuit closing positions, contacting said metallic plate to complete said successive temporary electrical connections.

6. The counting relay as claimed in claim 4, wherein each circuit closing wire is tensioned to normally rest on an insulated one of said shoulders in said individual notches, and further including, restoring means comprising a restoring magnet and a cam member, said cam member mounted adjacent to said circuit closing wires and positioned to engage said wires responsive to the operation of said restoring magnet to enable said circuit closing wires to return by said tensioning to said normal positions on the insulated shoulders in said notches.

7. A counting device comprising; a plurality of tensioned circuit closing wires held in stacked, spaced apart relationship at one end by insulated clamping members, alternate ones of said wires forming two parallel rows of wires extending longitudinally from said clamping members; a stationary comb interposed between said rows having a notch corresponding to each of said wires, each said notch including a normal position shoulder and a circuit closing position shoulder, each said wire initially resting on the normal position shoulder in its respective notch; extending means on the free end of each wire; a movable comb, positioned between said clamping members and said stationary comb, having an insulated lug individual to each said wire; means for displacing and returning said movable comb, each said wire except one supported out of the operating path of its respective lug while resting on its respective normal position shoulder; said one wire moved by its respective lug, upon displacement of said movable comb, from its normal position shoulder, the extending means on said one wire engaging the extending means on the next adjacent one of said wires to move said next adjacent wire from its normal position shoulder, said next adjacent wire moving, upon return of said movable comb, transversely to the direction of movement of said movable comb to its circuit closing position shoulder and into the operating path of its respective lug to complete a temporary electrical circuit in series with said one wire; said next adjacent wire and successive ones of said wires similarly being moved upon further displacements and returns of said movable comb, causing the extending means on said next adjacent wire and successive ones of said wires to move successive adjacent wires to their respective circuit closing position shoulders to complete successive temporary electrical circuits with said one wire, whereby each combination of displacement and return of said movable comb is counted.

8. The counting device claimed in claim 7 including a curved section in each of said wires, a restoring member movably mounted between said two parallel rows in close proximity to said curved sections and between said movable comb and said clamping members, and means for moving said restoring member to engage said curved sections of said wires to restore all operated wires back to their positions on said normal position shoulders.

References Cited in the file of this patent

UNITED STATES PATENTS

| | | |
|---|---|---|
| 1,521,591 | Beck | Jan. 6, 1925 |
| 1,647,792 | Gent | Nov. 1, 1927 |
| 1,954,758 | Reisner | Apr. 10, 1934 |
| 2,127,322 | Bloomberg | Aug. 16, 1938 |
| 2,452,568 | Harrison | Nov. 2, 1948 |
| 2,630,500 | Rommel | Mar. 3, 1953 |
| 2,639,416 | Graybill et al. | May 19, 1953 |